No. 853,625. PATENTED MAY 14, 1907.
F. CHARRON.
AUTOMOBILE VEHICLE FOR MILITARY PURPOSES.
APPLICATION FILED FEB. 5, 1907.
4 SHEETS—SHEET 3.
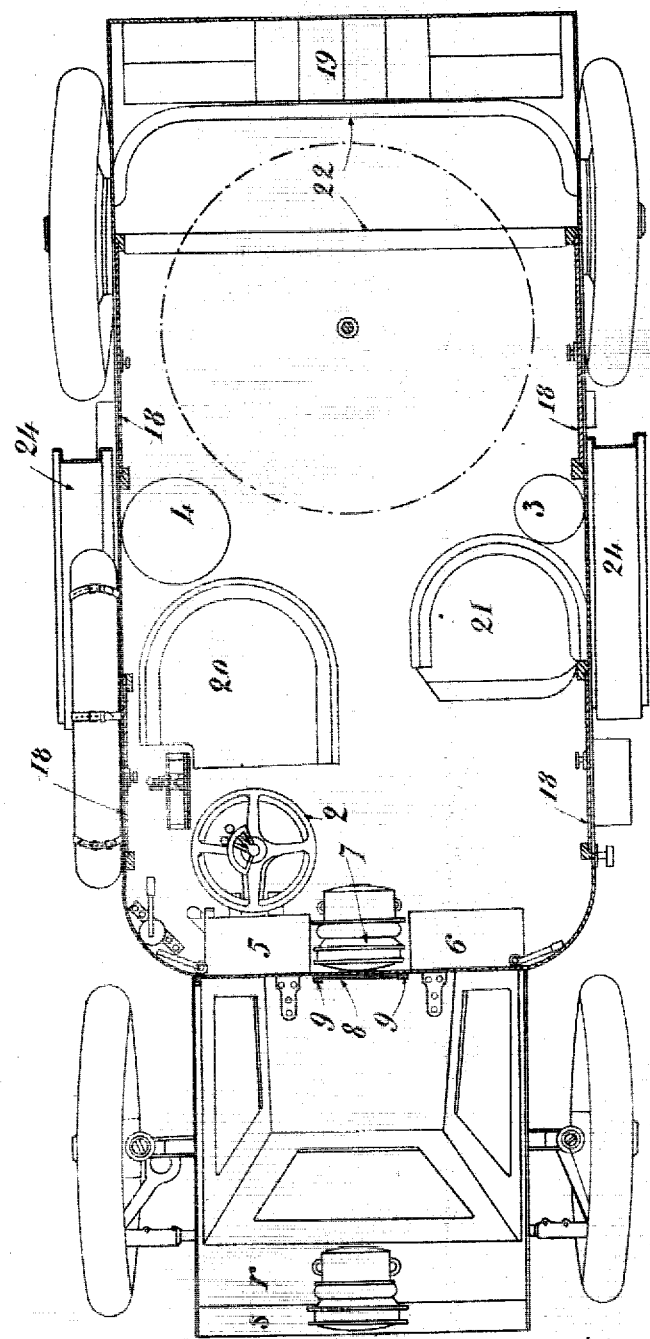
FIG_3.
WITNESSES
INVENTOR
Ferdinand Charron No. 853,625. PATENTED MAY 14, 1907.
F. CHARRON.
AUTOMOBILE VEHICLE FOR MILITARY PURPOSES.
APPLICATION FILED FEB. 5, 1907.
4 SHEETS—SHEET 4.
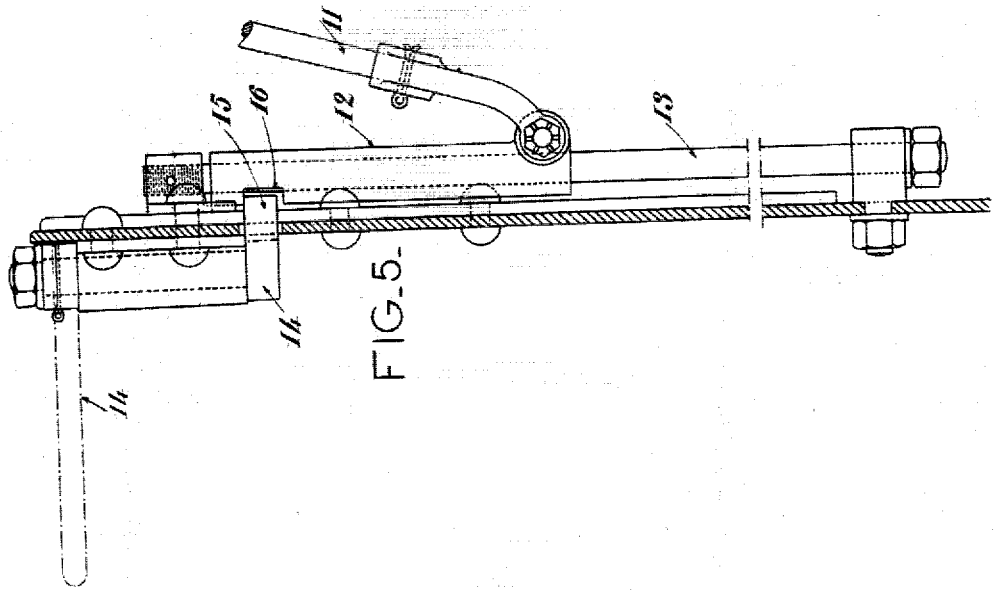
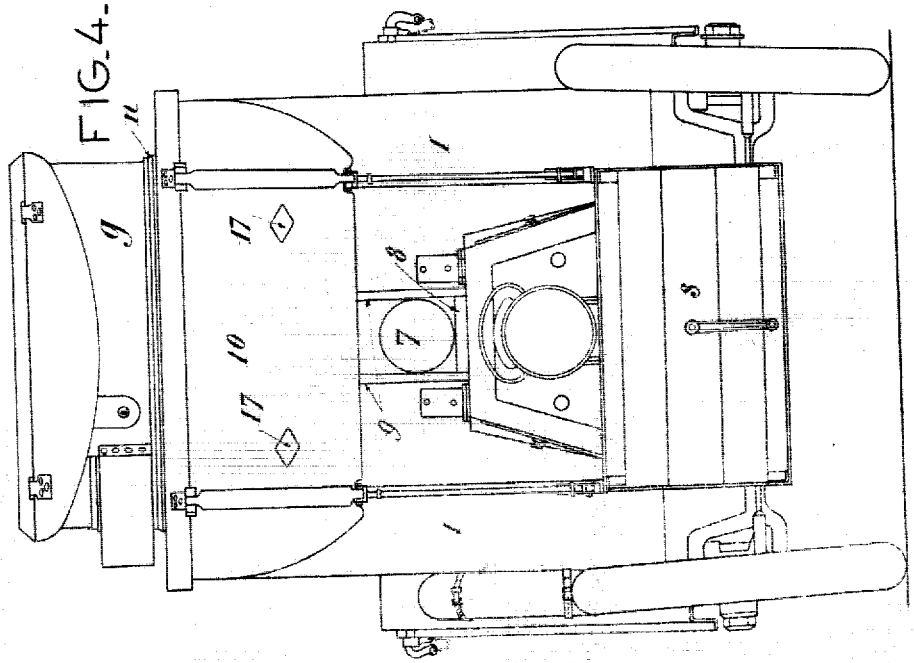
WITNESSES
INVENTOR
Ferdinand Charron

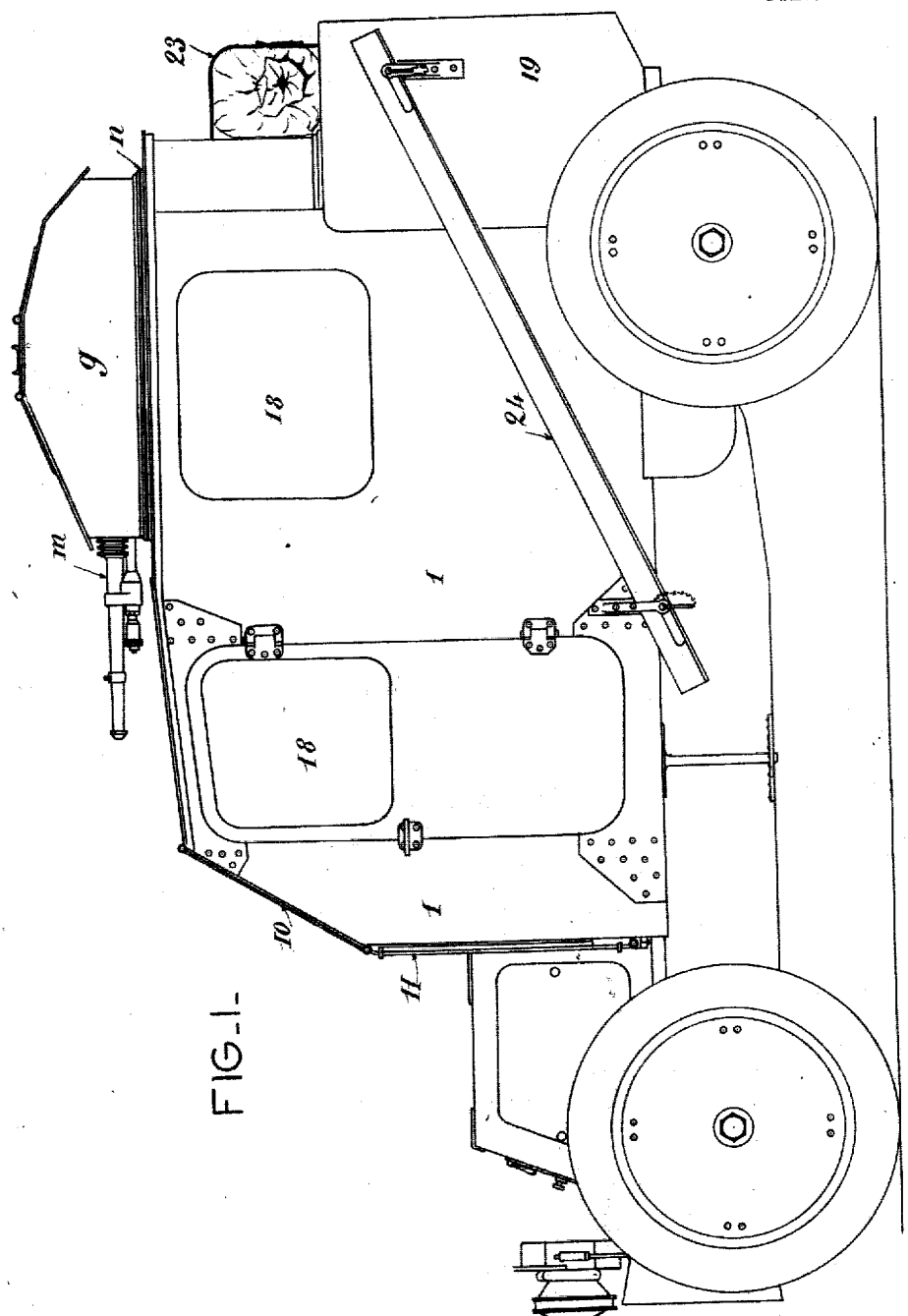

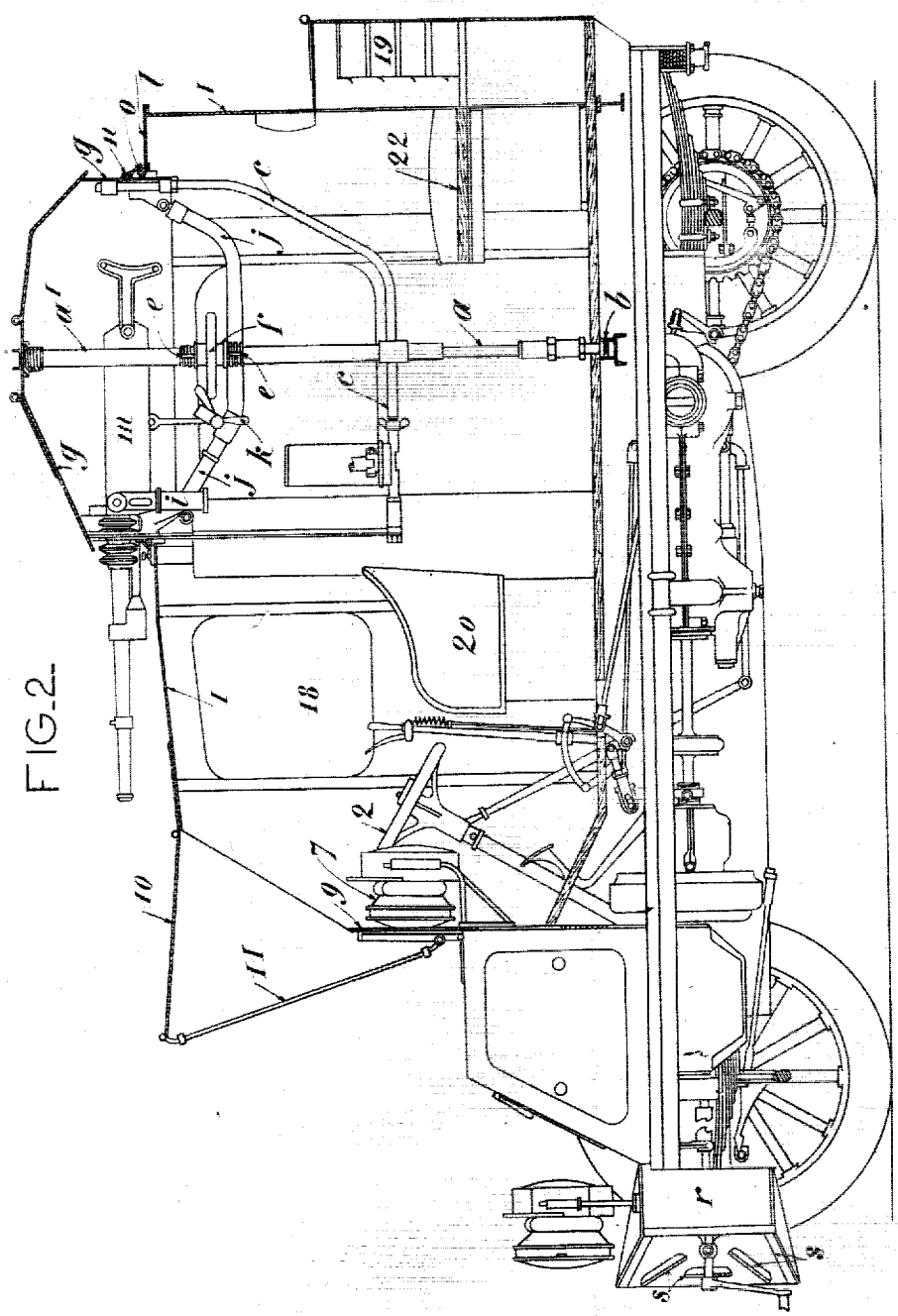

UNITED STATES PATENT OFFICE.

FERDINAND CHARRON, OF PUTEAUX, FRANCE.

AUTOMOBILE VEHICLE FOR MILITARY PURPOSES.

No. 853,625.      Specification of Letters Patent.      Patented May 14, 1907.

Application filed February 5, 1907. Serial No. 355,936.

*To all whom it may concern:*

Be it known that I, FERDINAND CHARRON, a citizen of France, residing at No. 7 Rue Ampère, Puteaux, Seine, France, have invented new and useful Improvements in Automobile Vehicles for Military Purposes, of which the following is a specification.

This invention relates to an automobile vehicle for military purposes provided with bullet-proof armor and with a rotatable turret armed with a gun or guns, or light ordnance, the said vehicle being suitable for reconnoitering in the presence of the enemy and for other war-like purposes.

The invention is illustrated in the annexed drawing by means of an example in which the turret is armed with a mitrailleuse.

Figure 1 is a side elevation of the vehicle, Fig. 2 a vertical, longitudinal section thereof, Fig. 3 a horizontal section, and Fig. 4 a front view. Fig. 5 is a detail view illustrating on a larger scale mechanism for instantaneously closing the shutter in front of the vehicle.

The vehicle comprises a complete under-frame provided with a cover 1 of steel, which serves both as a coach-body and as armor-plating to protect from bullets the occupants of the car and the controlling mechanism and the like, such as the steering-wheel 2, brake-lever, pedals, water-tank, oil-tank 3, petrol-tank 4, induction-coil 5, accumulators 6 and so on.

The cover 1 is surmounted by the turret $g$, which is also constructed of steel and is located, with a suitable amount of clearance at the circumference, in a circular aperture provided in the roof $l$. The turret $g$ is fixed at its central and upper parts to a tubular part $a'$ of a vertical pivot, and is also connected to the lower part of the latter by coupling-rods or curved struts $c$, to prevent rocking of the turret. The pivot referred to comprises the two parts $a'$ and $a$, of which the former is slidable on the latter. The part $a'$ is fixed to the turret, as has already been mentioned, and the lower end of the part $a$ is stepped on a bearing supported by a fixed plate and located in a box $b$ which prevents the lifting of the pivot.

At a convenient height the external part $a'$ of the pivot is provided with a screw-thread engaged by a threaded sleeve, to which is fixed a wheel $f$. Two slots $e$ diametrically opposite each other are formed in the part $a'$ and give passage to splines or feathers fixed to the central part $a$ of the pivot, the relative positions of these splines being such that the latter abut against the upper and under surfaces of the screw-threaded sleeve. It is, therefore, obvious that when the screw-threaded sleeve and wheel $f$ are rotated in either direction, the part $a'$ and the turret $g$ are either raised or lowered, since longitudinal movement of the sleeve relative to the part $a$ is prevented by the splines.

The turret normally rests on the roof $l$ by means of a circular flange $n$ and a compressible ring $o$ of india-rubber or leather.

The gun $m$ is placed outside the axis of the turret and is mounted on a support $i$ fixed to a cross-bar $j$; the latter also supports the mechanism for vertically training the gun.

To allow of training the gun, the wheel $f$ is rotated to elevate the turret, so that the latter can be rotated with great ease on its pivot. When the gun has been horizontally trained in this manner, the wheel $f$ is rotated in the opposite direction, to lower the flange $n$ of the turret onto the compressible ring $o$; by this means the turret is instantaneously fixed, and the gun can then be used without causing the slightest rotation of the turret.

The radiator $r$ arranged in front of the car is protected by fixed armor-plates $s$ which give passage to air but are adapted to stop bullets.

The lamp 7 arranged inside the cover 1 is adapted to be darkened by means of a shutter 8 slidable in guides 9.

The shutter 10 in front of the car is adapted to be instantaneously closed by means of mechanism illustrated in detail in Fig. 5. This shutter is hinged to the roof of the vehicle and supported by two arms 11 pivotally connected to sleeves 12 which are slidable on vertical rods 13 fixed to the front wall of the cover 1. To the inner part of this wall are fixed two vertical pivots on which are fulcrumed levers 14. When the sleeves 12 are at the upper ends of their travel they can be locked in that position by causing the ends 15 of the levers 14 to enter apertures 16 with which the sleeves are provided. To close the shutter 10 the levers 14 are rotated so that their ends 15 are removed from the said apertures, whereupon the shutter immediately descends by gravity, while the sleeves 12 slide down the rods 13. The shutter 10 is provided with eye holes 17.

Armored shutters 18 slidable in guides are adapted to close the window apertures. The car is provided with an ammunition box 19, seats 20 and 21 for the driver and commander in front, and a movable seat 22 for the attendants at the rear. Luggage can be carried as shown at 23.

At the sides of the vehicle are carried two detachable rails 24 of U-section adapted to form a bridge for crossing ditches and the like. When used as a bridge the said rails are connected to each other and held the proper distance apart by rods adapted to engage them.

Having now described my invention, what I claim as new and desire to secure by Letters Patent is:

1. An automobile vehicle for military purposes comprising an automobile under frame with its driving parts, a hood or cover of armor plating, a turret of sheet metal placed above said hood or cover and free to turn on a central pivot, an extensible pivot fixed to said turret and carried by the under frame, a compressible ring carried by the top of the hood or cover, and a circular flange carried by the turret and free to rest on said compressible ring, substantially as described and for the purpose set forth.

2. An automobile vehicle for military purposes comprising an automobile under frame with its driving parts, a hood or cover of armor plating, a turret of sheet metal placed above said hood or cover and free to turn on a central pivot, an extensible pivot fixed to said turret and carried by the under frame, a compressible ring carried by the top of the hood or cover, a circular flange carried by the turret and free to rest on said compressible ring, a front shutter hinged to the roof of the vehicle, two arms supporting said shutter, sleeves on which are pivoted said arms, vertical rods on which the sleeves are free to slide, apertures provided in said sleeves, two vertical pivots placed inside the hood or cover, levers fulcrumed on said pivots, and projections carried by said levers adapted to enter the apertures of the sleeves, substantially as described and for the purpose set forth.

3. An automobile vehicle for military purposes comprising an automobile under frame with its driving parts, a hood or cover of armor plating, a turret of sheet metal placed above said hood or cover and free to turn on a central pivot, an extensible pivot fixed to said turret and carried by the under frame, a compressible ring carried by the top of the hood or cover, a circular flange carried by the turret and free to rest on said compressible ring, a front shutter hinged to the roof of the vehicle, means for closing instantaneously said shutter, a radiator placed in front of the vehicle, armor-plates protecting said radiator though letting air pass through, a lamp placed in front, a metal shutter adapted to darken the lamp, and guides in which the shutter is free to slide, substantially as described and for the purpose set forth.

In testimony whereof I have signed my name to this specification in the presence of two subscribing witnesses.

FERDINAND CHARRON.

Witnesses:
ANTOINE LAVOIX,
HANSON C. COXE.